US008645585B2

(12) United States Patent
Wyatt et al.

(10) Patent No.: US 8,645,585 B2
(45) Date of Patent: Feb. 4, 2014

(54) SYSTEM AND METHOD FOR DYNAMICALLY CONFIGURING A SERIAL DATA LINK IN A DISPLAY DEVICE

(75) Inventors: David Wyatt, San Jose, CA (US); Lianghao Chen, Santa Clara, CA (US); David Matthew Stears, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 299 days.

(21) Appl. No.: 13/157,468

(22) Filed: Jun. 10, 2011

(65) Prior Publication Data

US 2012/0317607 A1 Dec. 13, 2012

(51) Int. Cl.
*G06F 3/00* (2006.01)
*G06F 9/00* (2006.01)

(52) U.S. Cl.
USPC .................................... 710/10; 710/19; 713/1

(58) Field of Classification Search
USPC ............................ 710/10, 18–19, 313; 713/1
See application file for complete search history.

(56) References Cited

U.S. PATENT DOCUMENTS 7,853,731 B1 * 12/2010 Zeng ............................... 710/18
7,937,501 B2 * 5/2011 Goodart et al. ................... 710/2
8,291,207 B2 * 10/2012 Kobayashi ........................ 713/1
8,380,912 B2 * 2/2013 Jaramillo ...................... 710/313
2002/0112099 A1 * 8/2002 Collier .............................. 710/1
2008/0231711 A1 * 9/2008 Glen et al. .................... 348/192
2009/0323722 A1 * 12/2009 Sharma ......................... 370/470
2010/0289949 A1 * 11/2010 Kobayashi .................... 348/469
2010/0289950 A1 11/2010 Kobayashi
2010/0289955 A1 11/2010 Kobayashi
2010/0293366 A1 * 11/2010 Kobayashi ........................ 713/2
2012/0079162 A1 * 3/2012 Jaramillo ...................... 710/316
2013/0007432 A1 * 1/2013 Kobayashi ........................ 713/1

OTHER PUBLICATIONS

International Search Report for PCT/US2012/041570. Dated Aug. 17, 2012.

* cited by examiner

*Primary Examiner* — Christopher Shin
(74) *Attorney, Agent, or Firm* — Patterson & Sheridan, LLP

(57) ABSTRACT

A technique is disclosed for dynamically reconfiguring a digital video link based on previously determined link training parameters. Reusing the previously determined link training parameters enables a no link training (NLT) protocol for quickly configuring the digital video link without the need for repeating a link training process. A display device advertises NLT capabilities information to a GPU indicating it can retain link characteristics for one or more link configurations. The GPU uses the NLT capabilities information to determine whether the display device is able to quickly transition to a specific link configuration using the NLT protocol, or to switch between configurations. The NLT capability allows a link to be advantageously quiesced and restored quickly while the GPU is transitioning in and out of power-saving sleep states, or placing the link in a more power efficient configuration, or higher-bandwidth higher-performance configuration. Additionally, the NLT capability allows a source to determine if the link configuration can be changed quickly while the display device retains the image, and thus can continue to present a constant screen for uninterrupted viewing.

36 Claims, 8 Drawing Sheets

SYSTEM AND METHOD FOR DYNAMICALLY CONFIGURING A SERIAL DATA LINK IN A DISPLAY DEVICE

BACKGROUND OF THE INVENTION

1. Field of the Invention

The invention relates generally to display systems and, more specifically, to a system and method for dynamically configuring a serial data link in a display device.

2. Description of the Related Art

Computer systems typically include a display device, such as a liquid crystal display (LCD), coupled to a video data link that transmits frames of video data from a graphics processing unit (GPU) to the display device. During normal operation, the GPU generates sequential video frames, each comprising a two-dimensional array of individual pixels. The video frames are typically generated by the GPU and stored within an associated frame buffer. Each video frame is then scanned out by the GPU as pixel data. The pixel data is transmitted via the video data link to the display device for display of a corresponding video frame.

The video data link comprises one or more lanes, each configured to transmit a bit of pixel data during a bit time interval. Each lane comprises a physical signal path, such as an electrical differential signal path. Manufacturing variation in the GPU, physical signal paths, and display device can impact the signal integrity of pixel data being transmitted via the video data link. Instantaneous temperature and voltage variation in the GPU and display device electronics can also impact the signal integrity of data on the video data link. One bit time conventionally represents such a small time interval that normal manufacturing variation in different elements associated with the video data link can significantly degrade signal integrity of the pixel data. Signal degradation includes, for example, lane to lane skew and selective frequency attenuation, which can degrade or close a signal eye pattern. To mitigate such signal degradation, interface circuits associated with the video data link execute a link training procedure to compensate for skew, frequency attenuation, and so forth.

Each time the video data link is activated, the link training procedure is performed on the video data link prior to transmitting pixel data to ensure proper signal integrity for the pixel data. The training procedure may take more than an entire frame time in certain scenarios, leading to an interruption such as a flicker, or temporary blanking of the display device. In certain scenarios, a computer system may need to transition between display modes that require the operation of the video data link to be modified, leading to a new link training procedure that can potentially disrupting proper display of frames on the display device. Such disruption can cause the display device to flicker or blank one or more frames, thereby degrading image quality.

As the foregoing illustrates, what is needed in the art is an improved technique for managing pixel data transmission between a GPU and a display device.

SUMMARY OF THE INVENTION

One embodiment of the present invention sets forth a method for configuring a digital video link coupled to a display device, comprising reading a capabilities register within the display device, based on data within the capabilities register, determining that the display device is capable of operating in conjunction with a current configuration for the digital video link without link training, enabling the digital video link, and, after transmitting at least one idle pattern via the digital link, transmitting active video data via the digital video link.

Other embodiments of the present invention include, without limitation, a computer-readable storage medium including instructions that, when executed by a processing unit, cause the processing unit to perform the techniques described herein as well as a computing device that includes a processing unit configured to perform the techniques described herein.

One advantage of the present invention is that a given digital video link may be reconfigured to operate in range of refresh modes from high performance to low power without dropping frames. This ability enables a GPU to dynamically select a refresh mode that satisfies an instantaneous requirement, such a high performance or low power for a dynamically determined number of frames.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
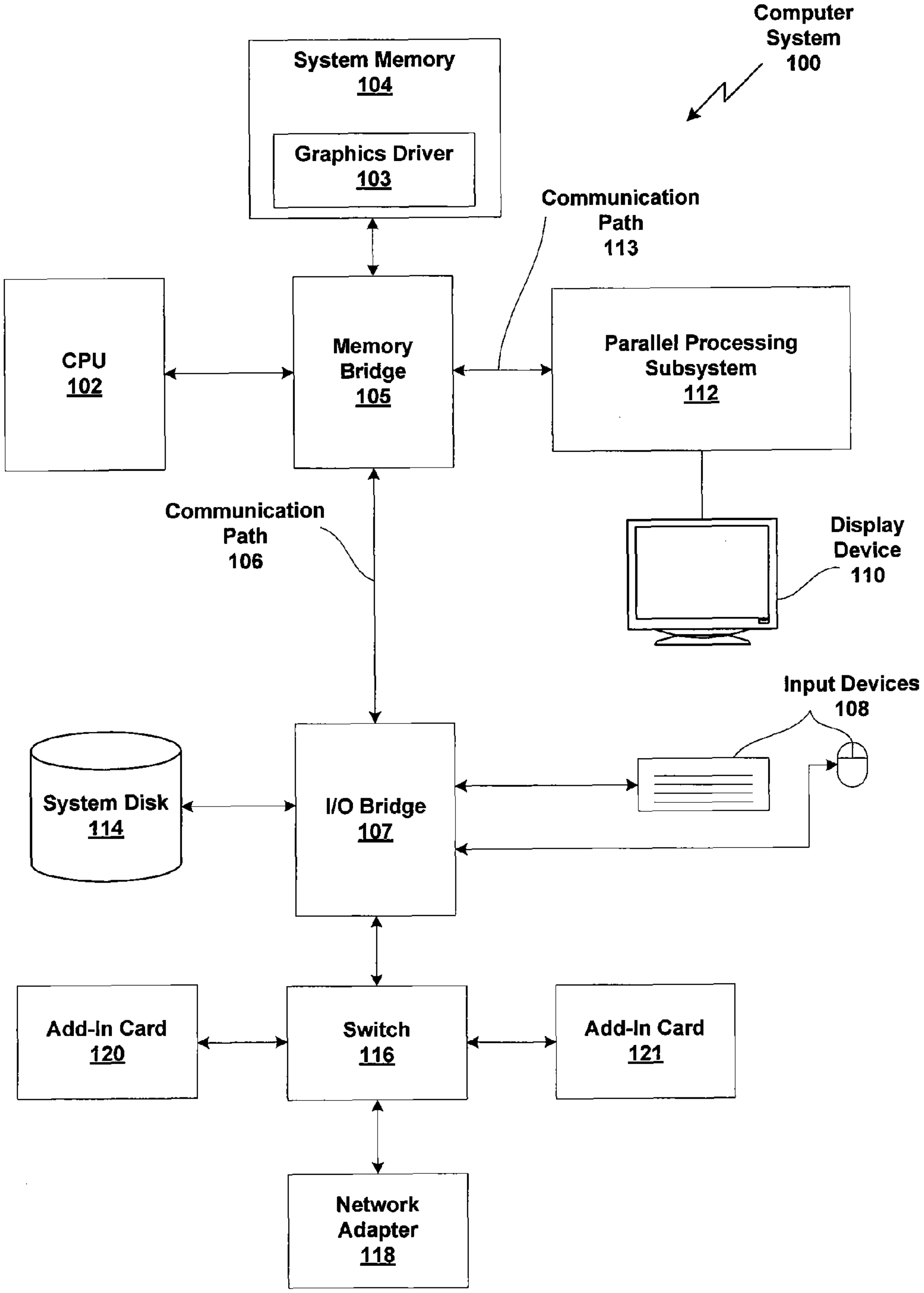
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A graphics driver 103 may be configured to send graphics primitives over communication path 113 for parallel processing subsystem 112 to generate pixel data for display on display device 110. A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2A:
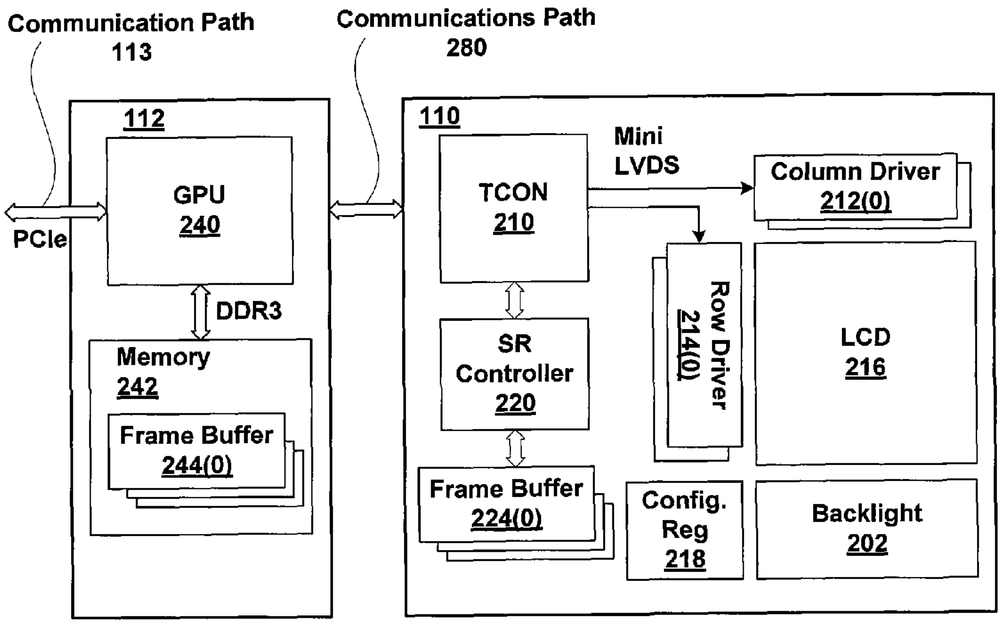
FIG. 2A illustrates a parallel processing subsystem coupled to a display device that includes a self-refreshing capability, according to one embodiment of the present invention.

FIG. 2A illustrates a parallel processing subsystem 112 coupled to a display device 110 that includes a self-refreshing capability, according to one embodiment of the present invention. As shown, parallel processing subsystem 112 includes a graphics processing unit (GPU) 240 coupled to a graphics memory 242 via a memory bus interface, such as an industry standard DDR3 bus interface. Graphics memory 242 includes one or more frame buffers 244. Parallel processing subsystem 112 is configured to generate video signals based on pixel data stored in frame buffers 244 and transmit the video signals to display device 110 via communications path 280. In general terms, the parallel processing subsystem 112 acts as a source device for the video signal and the display device 110 acts as a sink device for the video signal. Communications path 280 may be any video data link or interface known in the art, such as an embedded Display Port (eDP) interface.

GPU 240 may be configured to receive graphics primitives from CPU 102 via communications path 113, such as a PCIe bus. GPU 240 processes the graphics primitives to produce a frame of pixel data for display on display device 110 and stores the frame of pixel data in one or more frame buffers 244. In normal operation, GPU 240 is configured to scan out pixel data from frame buffers 244 to generate video signals for display on display device 110. In one embodiment, communications path 280 comprises an industry standard DisplayPort (DP).

In one embodiment, display device 110 includes a timing controller (ICON) 210, self-refresh controller (SRC) 220, a liquid crystal display (LCD) device 216, a backlight 202, one or more column drivers 212, one or more row drivers 214, and one or more local frame buffers 224, where M is the total number of local frame buffers implemented in display device 110. The backlight 202 provides an illumination source for the LCD device 216. The backlight 202 may be controlled by GPU 240. TCON 210 generates video timing signals for driving LCD device 216 via the column drivers 212 and row drivers 214. Column drivers 212, row drivers 214 and LCD device 216 may be any conventional column drivers, row drivers, and LCD device known in the art. As also shown, TCON 210 may transmit pixel data to column drivers 212 and row drivers 214 via a communication interface, such as a mini LVDS interface. In an alternative embodiment, the display device 110 does not include an SRC 220. For example, a low cost configuration of display device 110 may exclude the SRC 220 to achieve a lower overall cost of goods.

SRC 220 is configured to generate video signals for display on LCD device 216 based on pixel data stored in local frame buffers 224. In normal operation, display device 110 drives LCD device 216 based on the video signals received from parallel processing subsystem 112 over communications path 280. In contrast, when display device 110 is operating in a panel self-refresh mode, display device 110 drives LCD device 216 based on the video signals received from SRC 220.

GPU 240 may be configured to manage the transition of display device 110 into and out of the panel self-refresh mode. In certain scenarios, overall power consumption of computer system 100 may be reduced by operating display device 110 in the panel self-refresh mode during periods of graphical inactivity in the image displayed by display device 110. In one embodiment, to cause display device 110 to enter the panel self-refresh mode, GPU 240 may transmit a message to display device 110 using an in-band signaling method, such as by embedding a message in the digital video signals transmitted over communications path 280. In alternative embodiments, GPU 240 may transmit the message using a side-band signaling method, such as by transmitting the message using an auxiliary communications channel. Various signaling methods for signaling display device 110 to enter or exit the panel self-refresh mode are described below in conjunction with FIGS. 2B-2D.

After receiving a message to enter the self-refresh mode, display device 110 caches a frame of pixel data received over communications path 280 in local frame buffers 224. Display device 110 transitions control for driving LCD device 216 from the video signals generated by GPU 240 to video signals generated by SRC 220 based on the pixel data stored in local frame buffers 224. While the display device 110 is in the panel self-refresh mode, SRC 220 continuously generates repeating video signals representing the cached pixel data stored in local frame buffers 224 for one or more consecutive video frames.

In order to cause display device 110 to exit the panel self-refresh mode, GPU 240 may transmit a similar message to display device 110 using a similar method as that described above in connection with causing display device 110 to enter the panel self-refresh mode. After receiving the message to exit the panel self-refresh mode, display device 110 may be configured to synchronize with the video signals generated by GPU 240.

The amount of storage required to implement a self-refresh capability may be dependent on the size of the uncompressed frame of video used to continuously refresh the image on the display device 110. In one embodiment, display device 110 includes a single local frame buffer 224(0) that is sized to accommodate an uncompressed frame of pixel data for display on LCD device 216. The size of frame buffer 224(0) may be based on the minimum number of bytes required to store an uncompressed frame of pixel data for display on LCD device 216, calculated as the result of multiplying the width by the height by the color depth of the native resolution of LCD device 216. For example, frame buffer 224(0) could be sized for an LCD device 216 configured with a WUXGA resolution (1920×1200 pixels) and a color depth of 24 bits per pixel (bpp). In this case, the amount of storage in local frame buffer 224(0) available for self-refresh pixel data caching should be at least 6750 kB of addressable memory (1920*1200*24 bpp; where 1 kilobyte is equal to 1024 or $2^{10}$ bytes).

Display device 110 may be capable of displaying 3D video data, such as stereoscopic video data. Stereoscopic video data includes a left view and a right view of uncompressed pixel data for each frame of 3D video. Each view corresponds to a different camera position of the same scene captured approximately simultaneously. Some display devices are capable of displaying three or more views simultaneously, such as in some types of auto-stereoscopic displays.

In one embodiment, display device 110 may include a self-refresh capability in connection with stereoscopic video data. Each frame of stereoscopic video data includes two uncompressed frames of pixel data for display on LCD device 216. Each of the uncompressed frames of pixel data may be comprised of pixel data at the full resolution and color depth of LCD device 216. In such embodiments, local frame buffer 224(0) may be sized to hold one frame of stereoscopic video data. For example, to store uncompressed stereoscopic video data at WUXGA resolution and 24 bpp color depth, the size of local frame buffer 224(0) should be at least 13500 kB of addressable memory (2*1920*1200*24 bpp). Alternatively, local frame buffers 224 may include two frame buffers 224(0) and 224(1), each sized to store a single view of uncompressed pixel data for display on LCD device 216.

In one embodiment, display device 110 may include a dithering capability. Dithering allows display device 110 to display more perceived colors than the hardware of LCD device 216 is capable of displaying. Temporal dithering alternates the color of a pixel rapidly between two approximate colors in the available color palette of LCD device 216 such that the pixel is perceived as a different color not included in the available color palette of LCD device 216. For example, by alternating a pixel rapidly between white and black, a viewer may perceive the color gray. In a normal operating state, GPU 240 may be configured to alternate pixel data in successive frames of video such that the perceived colors in the image displayed by display device 110 are outside of the available color palette of LCD device 216. In a self-refresh mode, display device 110 may be configured to cache two successive frames of pixel data in local frame buffers 224. Then, SRC 220 may be configured to scan out the two frames of pixel data from local frame buffers 224 in an alternating fashion to generate the video signals for display on LCD device 216.

Figure 2B:
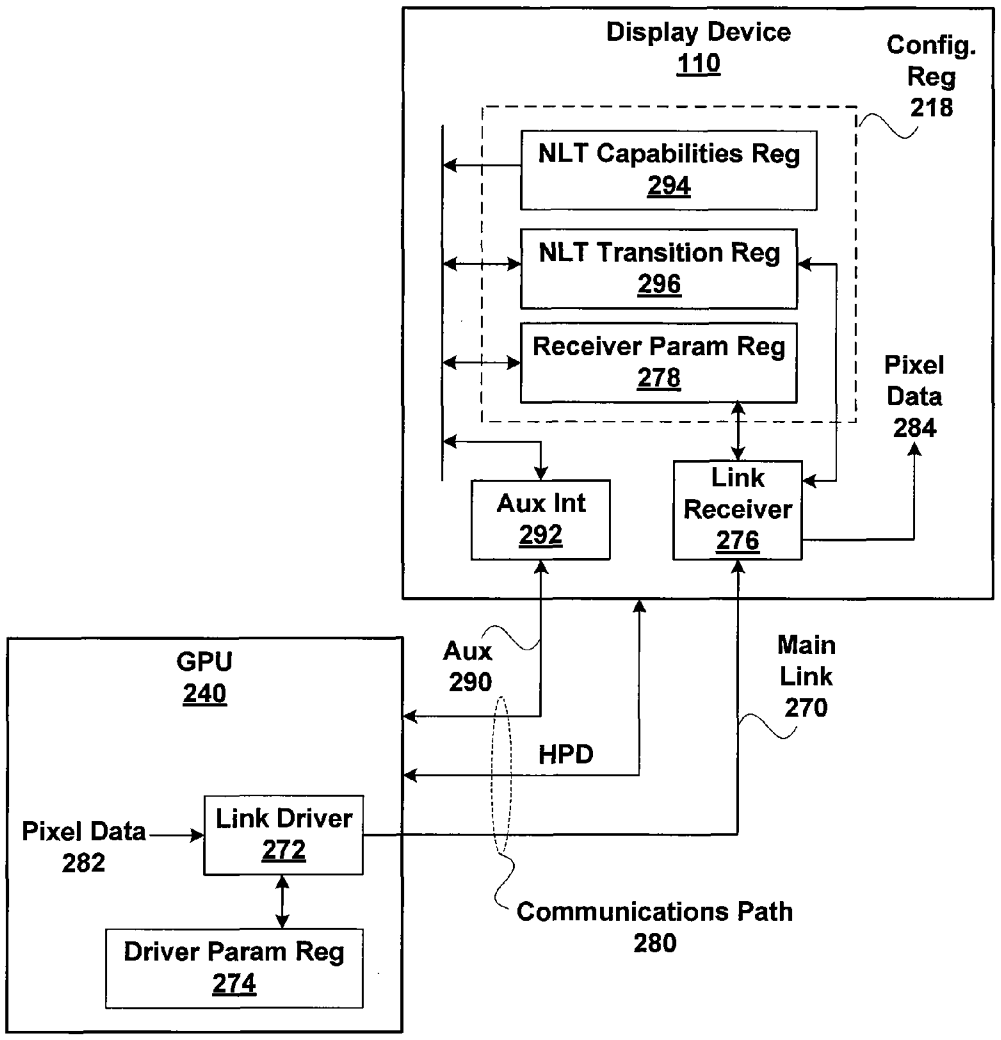
FIG. 2B illustrates a communications path that implements an embedded DisplayPort interface, according to one embodiment of the present invention.

FIG. 2B illustrates a communications path 280 that implements an embedded DisplayPort interface, according to one embodiment of the present invention. Embedded DisplayPort (eDP) is a standard digital video interface for internal display devices, such as an internal LCD device in a laptop computer. Communications path 280 includes a main link 270 comprising, for example, 1, 2 or 4 differential pairs (lanes) for high bandwidth data transmission. The communications path 280 also includes a hot-plug detect signal (HPD) as well as a single differential pair auxiliary channel (Aux) 290.

The main link 270 is a unidirectional communication channel from GPU 240 to display device 110. The GPU 240 may be configured to transmit video signals generated from pixel data 282 stored in frame buffers 244 via one, two, or four lanes of the main link 270. In alternative embodiments, an arbitrary number of lanes may be implemented. A link driver 272 within GPU 240 is configured to generate one or more high-speed differential signals corresponding to lanes of main link 270. The link driver 272 receives pixel data 282 formatted within a parallel data path and serializes the pixel data 282 for transmission as serial video signals over one or more lanes within the main link 270. The link driver 272 is also configured to execute link training procedures that generate link driver parameters consistent with reliable transmission of data via the main link 270. The link driver parameters comprise an implementation dependent set of values used to tune the link driver 272. Any technically feasible set of link driver parameters may be implemented without departing the scope of the present invention. Upon successfully completing link training on main link 270, the resulting link driver parameters are stored within driver parameter register 274. Exemplary link driver parameters may include a link driver parameter status flag to indicate whether the link driver parameters are valid, link drive strength, link driver pre-emphasis strength, and lane-to-lane skew between lanes of the main link 270.

A link receiver 276 within the display device 110 is configured to receive the serial video signals from main link 270 and to deserialize the serial video signals into pixel data 284, which is formatted within a parallel data path. The link receiver 276 is also configured to execute link training procedures to generate link receiver parameters consistent with reliable reception of serial video signals via the main link 270. The link receiver parameters comprise an implementation dependent set of values that may be used to tune link receiver 276. Upon successfully completing link training on the main link 270, the resulting link receiver parameters are stored within receiver parameter register 278. Exemplary link receiver parameters may include a link receiver parameter status flag to indicate whether the receiver parameters are valid, link receiver equalization factors, and lane to lane skew between lanes of the main link 270. One key function of the link receiver 276 is clock and data recovery (CDR). Clock recovery involves tuning an internal clock to match a frequency and phase of bits of data arriving on one or more lanes of the main link 270. Persons skilled in the art will understand that clock frequency and phase information may be recovered from a data pattern, and that an encoding regime such as the well known 8b/10b encoding regime provides sufficient data bit transition density to efficiently recover a data clock from a serial data stream. Other encoding regimes such as data scrambler regimes may also provide sufficient transition density to enable efficient data clock recover. In one embodiment, a scrambler circuit is reset periodically, such as at the start of a new frame, to provide a simple and consistent scrambler operating point. Data recovery involves sampling bits of data arriving from the main link 270 based on a recovered clock. Data recovery also includes estimating an independent sampling phase for each of the one or more lanes of the main link 270. Each independent sampling phase may be nominally determined during link training and dynamically estimated during normal operation to track short-term clock variation. Persons skilled in the art will recognize that link driver 272 and link receiver 276 collectively implement a serializer/deserializer (SerDes) function for serialized transmission of pixel data 282 over the main link 270. The serialized data is deserialized and reconstructed as pixel data 284 within the link receiver 276. During normal operation, with properly trained links, pixel data 284 is substantially identical to pixel data 282.

Link training may include, without limitation, determining parameters for link driver pre-emphasis, link receiver equalization, and signal to signal skew. Determining the parameters typically involves transmitting a series of known data patterns via the main link 270 from the GPU 240 to the display device 110 while adjusting the different parameters to find a substantially optimal overall combination of parameters.

Once link training is completed, the GPU 240 may transmit idle data patterns to the display device 110 via the main link 270. The idle data patterns are useful for maintaining frequency and phase lock within the link receiver 276 for the purpose of maintaining CDR readiness. Idle data patterns comprise specific symbols that need not convey pixel data 282, but do provide transitions that enable the link receiver 276 to provide CDR readiness. Data patterns are defined to convey pixel data 282 to the link receiver 276. When the main link 270 is in a trained state, and the link receiver 276 CDR function is locked and ready, the GPU 240 may transmit data patterns to convey pixel data 282 to the link receiver 276. The data patterns are reconstructed by the link receiver 276 into pixel data 284, which may be used to specify a video frame for display on the display device 110. The link driver 272 serializes the pixel data 282 for transmission over the main link 270. The link receiver 276 deserializes data from the main link 270 to generate pixel data 284, which is substantially identical to pixel data 282. The pixel data 284 may be used to compose a frame for display on the display device 110.

Persons skilled in the art will understand that different link training techniques may be implemented without departing the scope and spirit of the present invention, and that communications path 280 may comprise any video interface that implements link training in conjunction with transmitting video signals between GPU 240 and display device 110. The scope of the invention is, therefore, not limited to an Embedded DisplayPort video interface.

In one embodiment, the hot-plug detect signal (HPD) indicates to the GPU 240 that the display device 110 has been plugged into or unplugged from the GPU 240. To indicate a hot-plug event, the display device 110 drives HPD active to indicate that a display device has been connected to communications path 280. After display device 110 is connected to communications path 280, display device 110 may signal an interrupt request by quickly pulsing the HPD signal low, for example, for a duration of 0.5 and 1 millisecond.

In one embodiment, the auxiliary channel 290 implements a low bandwidth, bidirectional half-duplex data communication channel used for transmitting command and control signals from GPU 240 to display device 110. The auxiliary channel 290 may also used for transmitting data from the display device 110 to GPU 240. In one embodiment, messages indicating that display device 110 should enter or exit different operating modes, such as a panel self-refresh mode, may be communicated over the auxiliary channel. The GPU 240 may be configured to be a master device on the auxiliary channel 290 and display device 110 may be configured to be a slave device.

The auxiliary channel 290 may be used by the GPU 240 to access display port control and data (DPCD) registers within the display device 110. These registers comprise a control register space and, among various functions, enable the display device 110 to advertise capabilities to the GPU 240 and the GPU 240 to control the display device 110. In one embodiment, the auxiliary channel 290 is used to access a configuration register 218, comprising no link training (NLT) capabilities register 294, and an NLT transition register 296 located within an address space for the DPCD registers. In one embodiment the configuration register 218 includes at least one non-volatile storage element. In another embodiment the configuration register 218 includes at least one volatile storage element. In yet another embodiment, the configuration register 218 includes at least one read-only storage element. The NLT capabilities register 294 includes bit fields defined in Table 1, below. A read only NLT capability flag located at bit position zero of address 0x0330 of DPCD address space indicates whether the display device 110 is capable of NLT operation. A read-only Multi NLT capability flag located at bit position one of address 0x0330 of the DPCD address space indicates whether the display device 110 is capable of storing previous link configurations, including unique sets of link training parameters for each unique link configuration successfully trained in the operating history of the display device 110. If this bit is set to true ("1") and the GPU 240 has previously succeeded in training or configuring the main link 270 to a specific configuration, then the GPU 240 may perform an NLT transition to the specific configuration. If this bit is set to false ("0"), then the GPU may not perform an NLT transition and, instead, must proceed to a new configuration via a link training procedure.

The GPU 240 may initiate link configuration changes based on the NLT capability flag, the multi NLT capability flag, and an NLT start flag, described below in Table 2. A maximum image retention time is specified as a twenty-four bit integer within address range 0x0331-0x0333. The maximum image retention time specifies a maximum amount of time (in microseconds) for which the TCON 210 will allow an image being displayed to be retained without interpreting a lack of refresh to be a link failure and enter a safe-mode timeout. The GPU 240 may use this retention time specification to generally reduce power in a low power mode by slowing frame refresh activity within the boundaries of the retention time specification. Slowing refresh has the net effect of lowering instantaneous power consumption.

TABLE 1

NLT Capabilities Register

| DPCD Address | | Definition | Description |
|---|---|---|---|
| 0x0330 (Read Only) | Bit 0 | NLT Capability Flag | 1: Indicates Display Device is Capable of NLT Operation<br>0: Indicates Display Device is Not Capable of NLT Operation |

TABLE 1-continued

| NLT Capabilities Register | | | |
|---|---|---|---|
| DPCD Address | | Definition | Description |
| | Bit 1 | Multi NLT Capability Flag | 1: Indicates Display Device is capable of accepting changes in the set link configuration, including number of lanes and link speed per lane, during an NLT transition. The Display Device sets this bit at power-on if it can support NLT in multiple configurations. The GPU shall check this bit to confirm if changes can be made before altering the link configuration during NLT<br>0: Indicates Display Device Not Capable of NLT for Multiple Previous Configurations. |
| | Bit 2 | NLT Capable Config-uration | 1: Indicates the Display Device has saved link training and equalization settings for a currently proposed link configuration, and is capable of transitioning to the proposed link configuration using NLT.<br>0: Indicates the Display Device is not able to transition to the proposed setting using NLT. |
| | Bits 7:3 | Reserved Bits | |
| 0x0331-0x0333 | Bits 23:0 | Max Image Retention Time | The Maximum Amount of Time in Microseconds for which TCON Will Allow Panel Image Retention Without Causing a Link Failure of Safe-Mode Timeout |

An NLT protocol is defined based on NLT capabilities of the display device 110 to enable rapid reconfiguration of the main link 270. The NLT protocol involves reconfiguring the main link 270 to a different configuration using previously determined link receiver parameters and link driver parameters. By using previously determined link driver parameters and link receiver parameters, only clock recovery in the link receiver 276 is generally necessary to establish reliable communication along the main link 270 for arbitrary given link configuration. Clock recovery is quickly established in the receiver by receiving idle data patterns transmitted by the GPU 240.

The NLT transition register 296 includes a one bit read-write register, referred to as a NLT start flag. The NLT start flag is used to initiate the NLT change protocol. The NLT start flag indicates to the display device 110 to proceed with the NLT protocol for changing link configuration rather than detecting what would otherwise appear to be a link failure when the GPU 240 disables the main link 170. The GPU 240 sets the NLT start flag to true ("1") to initiate the NLT protocol. The display device 110 clears the NLT start flag back to false ("0") once the link receiver 276 is resynchronized with the main link 270. The link receiver 276 is resynchronized when the CDR function within the link receiver 276 is reliably capturing idle patterns from the main link 270. In one implementation, indicated by the multi NLT capability flag being set true, if the new configuration has been previously and successfully link trained, then the associated link driver parameters are available to the link driver 272 and link receiver parameters are available to the link receiver 276. In one embodiment, driver parameter register 274 comprises non-volatile storage configured to store link driver parameters associated with one or more successful link training configurations. Similarly, receiver parameter register 278 comprises non-volatile storage configured to store link receiver parameters associated with one or more successful link training configurations. In one embodiment, receiver parameter register 278 includes non-volatile, read-only storage for predetermined parameters for certain configurations. The predetermined parameters may be generated using any technically feasible techniques including any experimental, measurement-based, or simulation-based techniques.

TABLE 2

| NLT Transition Register | | | |
|---|---|---|---|
| DPCD Address | | Definition | Description |
| 0x0334 (Read/Write) | Bit 0 | NLT Start Flag | GPU Sets to "1" to Indicate Initiation of NLT Protocol. Display Device Clears to "0" Once Synchronization Achieved for Main Link. |
| | Bits 7:1 | Reserved Bits | |

The driver parameter register 274 may be implemented within the GPU 240, as shown, or within an external device. The driver parameter register 274 may be configured to store an arbitrarily large number of unique sets of link driver parameters, so that any commonly encountered number of display devices 110 and operating modes for each one of the display devices 110 may be stored within the driver parameter register 274. The receiver parameter register 278 may be configured to store an arbitrarily large number of unique sets of link receiver parameters, so that any commonly encountered number of operating modes for a given display device 110 may be stored therein. During normal operation, each previously trained configuration is stored as link driver parameters in the driver parameter register 274 and link receiver parameters within the receiver parameter register 278. When the GPU 240 selects a certain previously trained configuration for operation, previously trained link driver parameters are loaded into the link driver 272 from the drive parameter register 274, and previously trained link receiver parameters are loaded into the link receiver 276 from the receiver parameter register 278. By storing and retrieving previously trained parameters for the link driver 272 and link receiver 276, the main link 270 may be reconfigured rapidly, and without need for re-training.

In certain embodiments, the receiver parameter register 278 may provide limited storage relative to the driver parameter register 274. For example, the receiver parameter register 278 may be configured to store only one or two sets of link receiver parameters, whereas the driver parameter register 274 may provide a hundred or more sets of link driver parameters. In such systems, a given link driver configuration may be trained and stored within the driver parameter register 274 and a corresponding link receiver configuration may be trained and stored within the receiver parameter register 278. The given link configuration may be subsequently overwritten within the receiver parameter register 278, but remain available within the driver parameter register 274. In one embodiment, if the GPU 240 attempts to transition the main link 270 to the given link configuration, the display device 110 reports that the given link configuration is unavailable using any technically feasible technique. For example, the display device 110 may simply declare a link training failure, forcing a retraining session of the main link 270 using the given link configuration. In one embodiment, if the display device 110 fails to confirm operation of the main link 270 within 50 mS or within four missed scrambler reset times, then the main link 270 is configured to perform a new link training procedure for the current link configuration. New link training parameters may overwrite a corresponding set of previously stored training parameters.

In one embodiment, the display device 110 is configured to report which previously trained configurations are available. Reporting may be implemented by exposing certain portions of the receiver parameter register 278 for read access by the GPU 240. Alternatively, reporting may be implemented using a query-response regime, whereby a proposed configuration is written to the display device 110, and a status register within the display device 110 indicates whether the proposed configuration is available for NLT operation.

Figure 2C:
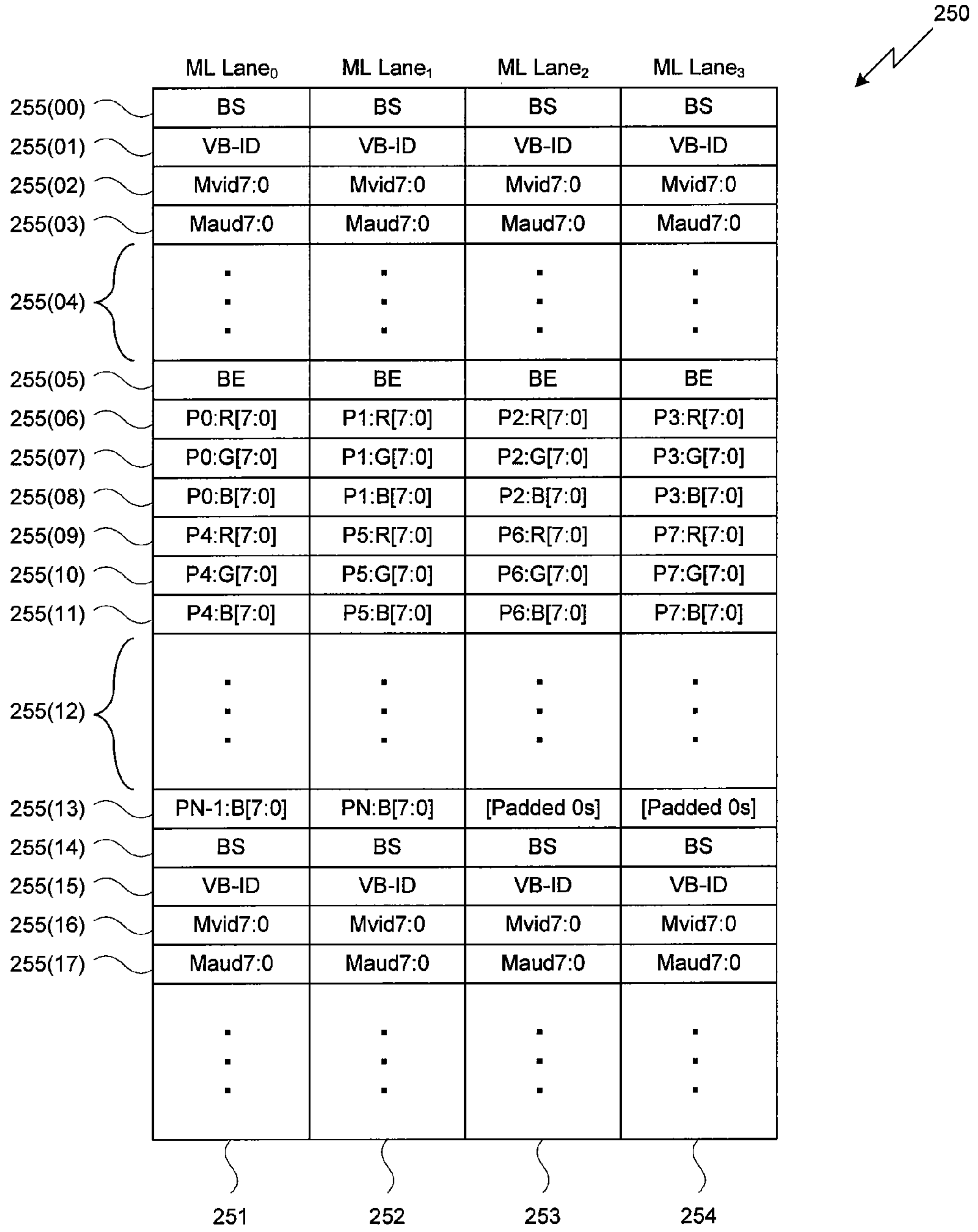
FIG. 2C is a conceptual diagram of digital video signals generated by a GPU for transmission over communications path, according to one embodiment of the present invention.

FIG. 2C is a conceptual diagram of digital video signals 250 generated by a GPU 240 for transmission over communications path 280, according to one embodiment of the present invention. As shown, digital video signals 250 are formatted for transmission over four lanes (251, 252, 253 and 254) of the main link of an eDP video interface. The main link of the eDP video interface may operate at one of three link symbol clock rates, as specified by the eDP specification (162 MHz, 270 MHz or 540 MHz). In one embodiment, GPU 240 sets the link symbol clock rate based on a link training operation that is performed to configure the main link when a display device 110 is connected to communications path 280. For each link symbol clock cycle 255, a 10-bit symbol, which encodes one byte of data or control information using 8b/10b encoding, is transmitted on each active lane of the eDP interface.

The format of digital video signals 250 enables secondary data packets to be inserted directly into the digital video signals 250 transmitted to display device 110. In one embodiment, the secondary data packets may include messages sent from GPU 240 to display device 110 that request display device 110 to enter or exit a panel self-refresh mode. Such secondary data packets enable one or more aspects of the invention to be realized over the existing physical layer of the eDP interface. It will be appreciated that this form of in-line signaling may be implemented in other packet based video interfaces and is not limited to embodiments implementing an eDP interface.

Secondary data packets may be inserted into digital video signals 250 during the vertical or horizontal blanking periods of the video frame represented by digital video signals 250. Digital video signals 250 are packed to represent one horizontal line of pixel data 282 at a time. For each horizontal line of pixel data, the digital video signals 250 include a blanking start (BS) framing symbol during a first link clock cycle 255(00) and a corresponding blanking end (BE) framing symbol during a subsequent link clock cycle 255(05). The portion of digital video signals 250 between the BS symbol at link symbol clock cycle 255(00) and the BE symbol at link symbol clock cycle 255(5) corresponds to the horizontal blanking period.

Control symbols and secondary data packets may be inserted into digital video signals 250 during the horizontal blanking period. For example, a vertical blank identifier (VB-ID) symbol is inserted in the first link symbol clock cycle 255(01) after the BS symbol. The VB-ID symbol provides display device 110 with information such as whether the main video stream is in the vertical blanking period or the vertical display period, whether the main video stream is interlaced or progressive scan, and whether the main video stream is in the even field or odd field for interlaced video. Immediately following the VB-ID symbol, a video time stamp (Mvid7:0) and an audio time stamp (Maud7:0) are inserted at link symbol clock cycles 255(02) and 255(03), respectively. Dummy symbols may be inserted during the remainder of the link symbol clock cycles 255(04) during the horizontal blanking period. Dummy symbols may be a special reserved symbol indicating that the data in that lane during that link symbol clock cycle is dummy data. Link symbol clock cycles 255(04) may have a duration of a number of link symbol clock cycles such that the frame rate of digital video signals 250 over communications path 280 is equal to the refresh rate of display device 110.

A secondary data packet may be inserted into digital video signals 250 by replacing a plurality of dummy symbols during link symbol clock cycles 255(04) with the secondary data packet. A secondary data packet is framed by special secondary start (SS) and secondary end (SE) framing symbols. Secondary data packets may include an audio data packet, link configuration information, or a message requesting display device 110 to enter or exit a panel self-refresh mode.

The BE framing symbol is inserted in digital video signals 250 to indicate the start of active pixel data for a horizontal line of the current video frame. As shown, pixel data P0 . . . PN has an RGB format with a per color channel bit depth (bpc) of 8-bits. Pixel data P0 associated with the first pixel of the horizontal line of video is packed into the first lane 251 at link symbol clock cycles 255(06) through 255(08) immediately following the BE symbol. A first portion of pixel data P0 associated with the red color channel is inserted into the first lane 251 at link symbol clock cycle 255(06), a second portion of pixel data P0 associated with the green color channel is inserted into the first lane 251 at link symbol clock cycle 255(07), and a third portion of pixel data P0 associated with the blue color channel is inserted into the first lane 251 at link symbol clock cycle 255(08). Pixel data P1 associated with the second pixel of the horizontal line of video is packed into the second lane 252 at link symbol clock cycles 255(06) through 255(08), pixel data P2 associated with the third pixel of the horizontal line of video is packed into the third lane 253 at link symbol clock cycles 255(06) through 255(08), and pixel data P3 associated with the fourth pixel of the horizontal line of video is packed into the fourth lane 254 at link symbol clock cycles 255(06) through 255(08). Subsequent pixel data of the horizontal line of video are inserted into the lanes 251-254 in a similar fashion to pixel data P0 through P3. In the last link symbol clock cycle to include valid pixel data, any unfilled lanes may be padded with zeros. As shown, the third lane 253 and the fourth lane 254 are padded with zeros at link symbol clock cycle 255(13).

The sequence of data described above repeats for each horizontal line of pixel data in the frame of video, starting with the top most horizontal line of pixel data. A frame of video may include a number of horizontal lines at the top of the frame that do not include active pixel data for display on display device 110. These horizontal lines comprise the vertical blanking period and may be indicated in digital video signals 250 by setting a bit in the VB-ID control symbol.

Figure 2D:
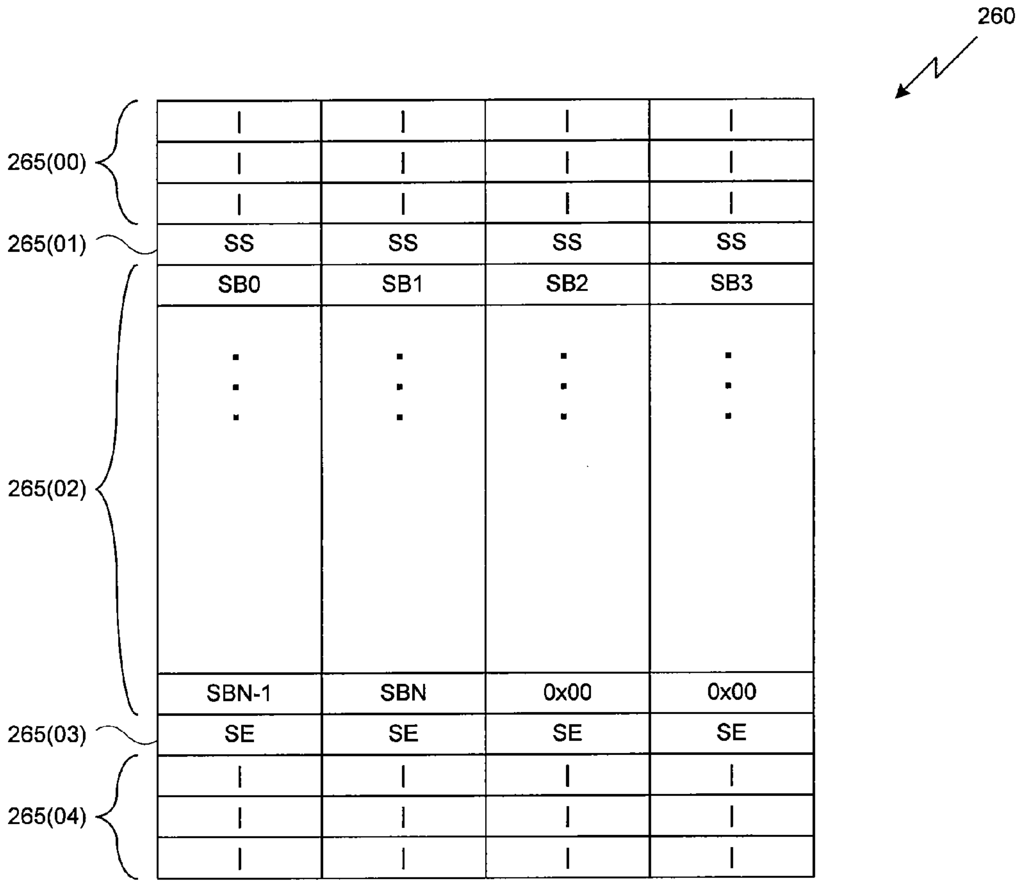
FIG. 2D is a conceptual diagram of a secondary data packet inserted in the horizontal blanking period of the digital video signals of FIG. 2C, according to one embodiment of the present invention.

FIG. 2D is a conceptual diagram of a secondary data packet 260 inserted in the horizontal blanking period of the digital video signals 250 of FIG. 2C, according to one embodiment of the present invention. A secondary data packet 260 may be inserted into digital video signals 250 by replacing a portion of the plurality of dummy symbols in digital video signals 250. For example, FIG. 2D shows a plurality of dummy symbols at link symbol clock cycles 265(00) and 265(04). GPU 240 may insert a secondary start (SS) framing symbol at link symbol clock cycle 265(01) to indicate the start of a secondary data packet 260. The data associated with the secondary data packet 260 is inserted at link symbol clock cycles 265(02). Each byte of the data (SB0 . . . SBN) associated with the secondary data packet 260 is inserted in one of the lanes 251-254 of digital video signals 250. Any slots not filled with data may be padded with zeros. GPU 240 then inserts a secondary end (SE) framing symbol at link symbol clock cycle 265(03).

In one embodiment, the secondary data packet 260 may include a header and data indicating that the display device 110 should enter or exit a self-refresh mode. For example, the secondary data packet 260 may include a reserved header code that indicates that the packet is a panel self-refresh packet. The secondary data packet may also include data that indicates whether display device 110 should enter or exit a panel self-refresh mode.

As described above, GPU 240 may send messages to display device 110 via an in-band signaling method, using the existing communications channel for transmitting digital video signals 250 to display device 110. In alternative embodiments, GPU 240 may send messages to display device 110 via a side-band method, such as by using the auxiliary communications channel in communications path 280. In other alternative embodiments, the GPU 240 may be configured to use any other technically feasible side band channel to communicate with display device.

Figure 3A:
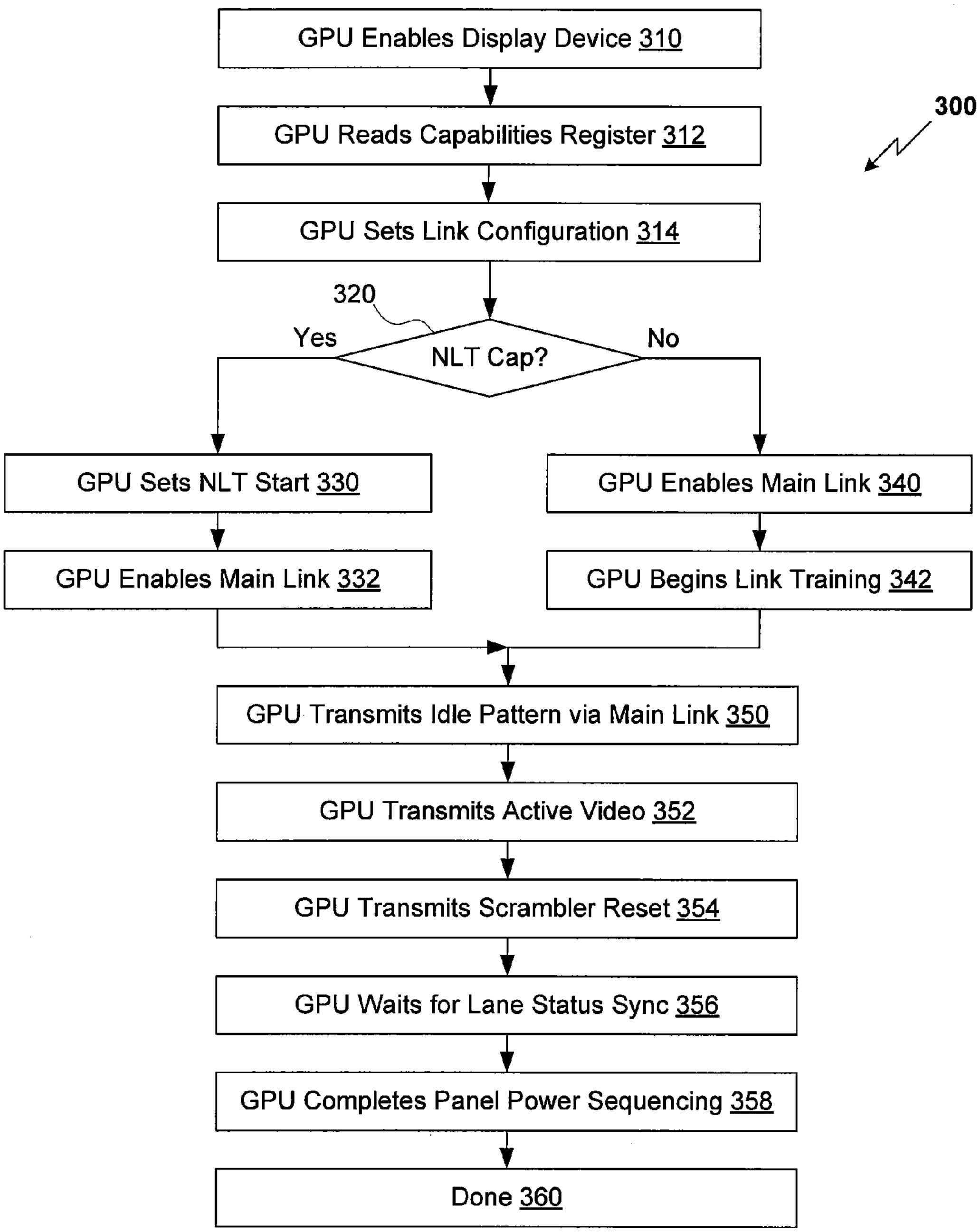
FIG. 3A sets forth a flowchart of method steps for a cold start using a no link training protocol, according to one embodiment of the present invention.

FIG. 3A sets forth a flowchart of method steps 300 for a cold start using a no link training protocol, according to one embodiment of the present invention. Although the method steps are described in conjunction with the systems of FIGS. 1, 2A-2D, persons skilled in the art will understand that any system configured to perform the method steps, in any order, is within the scope of the invention.

Certain branches of the method steps 300 assume successful prior completion of link training for a current link configuration. Link receiver parameters for successful link training are stored in receiver parameter register 278 and used to configure the link receiver 276 for each link configuration. Link driver parameters are stored in driver parameter register 274 and used to configure the link driver 272. In one embodiment, the GPU 240 may set relevant configuration information by writing an appropriate DPCD register within the display device 110.

The method begins in step 310, where the GPU 240 enables the display device 110. In one embodiment, the GPU 240 enables the display device 110, for example by direct electrical activation. In another embodiment, the display device 110 is enabled by writing a designated control register within the DPCD register space. In step 312, the GPU 240 reads at least the NLT capabilities register 294 of FIG. 2B. As described previously, the NLT capabilities register 294 indicates whether the display device 110 is able to operate in NLT mode. In step 314, the GPU 240 sets a current link configuration for the main link 270.

If, in step 320, the NLT capabilities register 294 indicates that the display device 110 is able to operate in NLT mode, and the GPU 240 verifies that the same display device 110 is still attached, then the method proceeds to step 330. Any technically feasible technique may be implemented to verify the same display device 110 is still attached. In step 330, the GPU 240 sets a present link configuration for the main link 270 corresponds to the link configuration most recently established for the main link 270. A given link configuration may include, for example, how many lanes should be active, what clock frequency should be used to transfer data over the active lanes, what image resolution should be used, and so forth.

In step 330, the GPU sets the NLT start flag within the NLT transition register illustrated in Table 2. In step 332, the GPU enables the main link 270. To enable the main link 270, the CPU writes to a designated register within the DPCD register space of the display device 110. The GPU 240 configures the link driver 272, based on link driver parameters stored in driver parameter register 274. The display device 110 similarly configures the link receiver 276, based on link receiver parameters stored in receiver parameter register 278. The link driver parameters and link receiver parameters have previously been determined via a conventional link training process and should remain valid for present operation of the main link 270. Once the main link 270 is enabled, the display device 110 begins a process to synchronize itself to the main link 270. This process is described in greater detail below in FIG. 3B. In step 350, the GPU 240 transmits an idle pattern via the main link 270. In certain embodiments, plural idle patters are transmitted. The idle pattern is used by the link receiver 276 to ready the CDR function for capturing video data from the main link 270. In step 352, the GPU 240 begins transmitting active video data comprising at least a frame of pixel data 282. In step 354, the GPU 240 transmits a scrambler reset signal. In step 356, the GPU waits for the display device 110 to indicate that lanes within the main link 270 are synchronized. In step 358, the GPU 240 completes any additional power sequencing control for the display device 110. The method terminates in step 360. Any technically feasible techniques may be used to implement steps 354, 356, and 358 without departing the scope and spirit of the present invention.

Returning to step 320, if the NLT capabilities register 294 indicates that the display device 110 is not able to operate in NLT mode, or if the GPU 240 is unable to verify that the same display device 110 is still attached, then the method proceeds to step 340, where the GPU 240 enables the main link 270. In step 342, the GPU 240 performs link training, for example according to conventional standards. The method then proceeds to step 350.

Figure 3B:
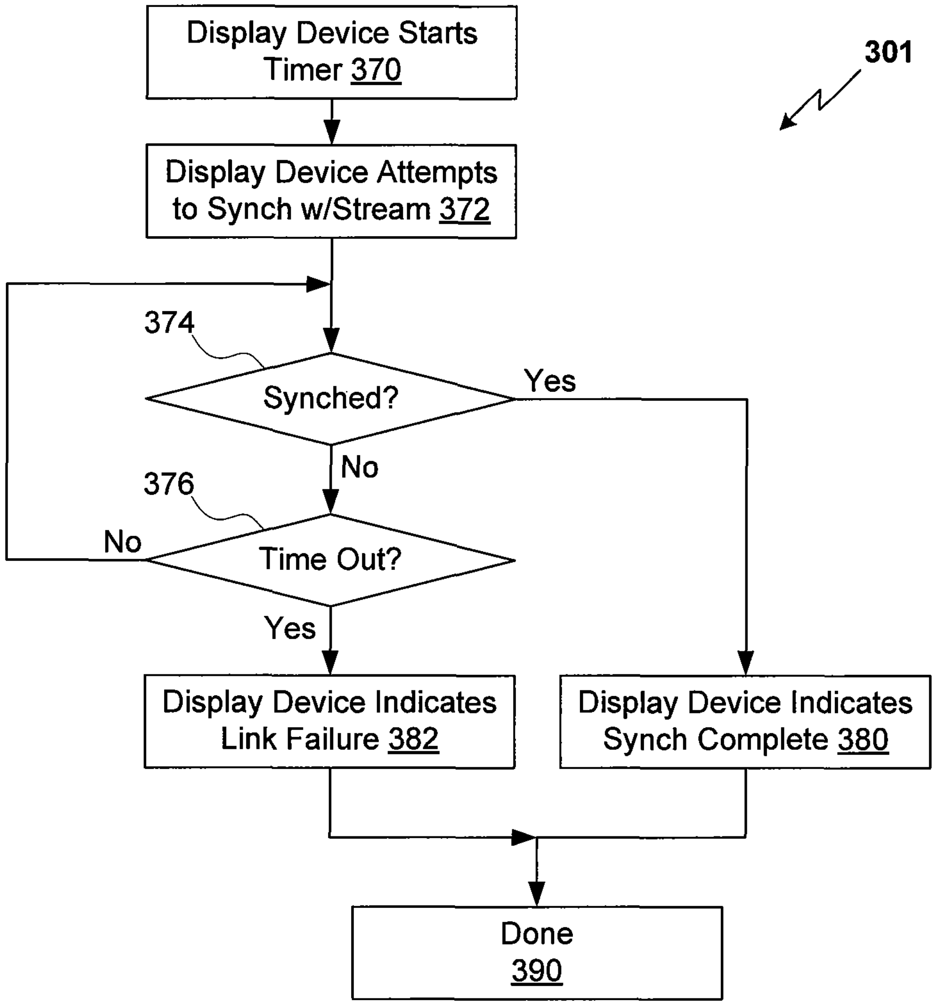
FIG. 3B sets forth a flowchart of method steps for synchronizing the display device to the main link, according to one embodiment of the present invention.

FIG. 3B sets forth a flowchart of method steps 301 for synchronizing the display device 110 to the main link 270, according to one embodiment of the present invention. Although the method steps are described in conjunction with the systems of FIGS. 1, 2A-2D, persons skilled in the art will understand that any system configured to perform the method steps, in any order, is within the scope of the invention.

The method begins in step 370, where the display device 110 starts a time out timer. In step 372, the display device 110 attempts to synchronize with a data stream, such as an idle pattern, being transmitted via the main link 270. If, in step 374, the display device 110 has achieved synchronization with the main link 270, then the method proceeds to step 380, where the display device 110 indicates that synchronization has completed. Synchronization completion may be indicated, for example, by setting an appropriate DPCD register flag within the display device 110. The method terminates in step 390.

Returning to step 374, if the display device 110 has not achieved synchronization with the main link 270, then the method proceeds to step 276. If, in step 276, the time out timer indicates a time out condition, then a link failure has occurred and the method proceeds to step 382. In step 382, the display device 110 indicates a link failure. The link failure may be indicated, for example, by setting an appropriate DPCD register flag within the display device 110.

Figure 4:
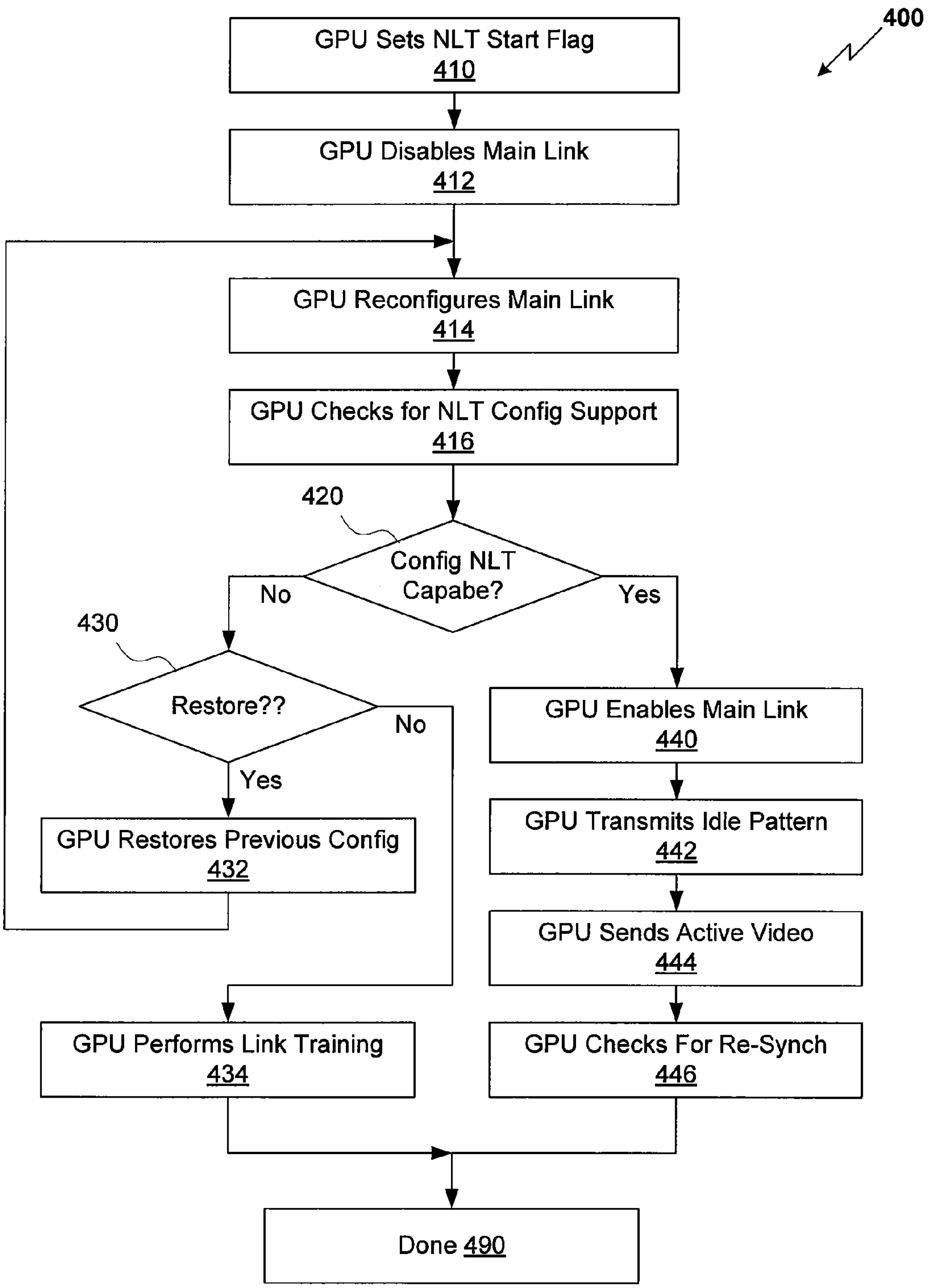
FIG. 4 sets forth a flowchart of method steps for changing a main link configuration using a no link training protocol, according to one embodiment of the present invention.

FIG. 4 sets forth a flowchart of method steps 400 for changing a main link configuration using a no link training protocol, according to one embodiment of the present invention. Although the method steps are described in conjunction with the systems of FIGS. 1, 2A-2D, persons skilled in the art will understand that any system configured to perform the method steps, in any order, is within the scope of the invention.

The method steps 400 assume previously successful completion of link training for specified link configurations and that the display device 110 is capable of multi NLT operation, indicated by the multi NLT capability flag being set to true. Link receiver parameters for successful link training are stored in receiver parameter register 278 and used to configure the link receiver 276 for changes in link configuration. Link driver parameters are stored in driver parameter register 274 and used to configure the link driver 272. In one embodiment, the GPU 240 may set link configuration information by writing an appropriate DPCD register within the display device 110.

The method begins in step 410, where the GPU 240 sets the NLT start flag within the NLT transition register 296 of FIG. 2B. As described previously, setting the NLT start flag (writing a one to the NLT start flag) indicates that the GPU 240 is about to initiate NLT operation of the main link 270. In step 412, the GPU 240 disables the main link 270, halting the flow of data over the main link 270. Although the main link 270 is disabled at this point, display device 110 does not determine that a link error has occurred in this case because the NLT start flag is set true. In step 414, the GPU 240 reconfigures the main link 270 to a proposed configuration. This different configuration may have been previously and successfully trained on the main link 270, and appropriate parameters may be available to the link driver 272 and link receiver 276. In step 416, the GPU 240 reads the NLT capable configuration flag within the NLT capabilities register shown in Table 1 to check for NLT configuration support for the proposed configuration. If, in step 420, the NLT capability configuration flag indicates that the display device 110 supports the proposed configuration with NLT, then the method proceeds to step 440. In step 440, the GPU 240 enables the main link 270. In step 442, the GPU 240 transmits at least one idle data pattern via the main link 270. In one embodiment, the GPU 240 transmits at least five idle data patterns via the main link 270. While CDR locking is necessary at this point, link training should not be necessary. By bypassing conventional link training, the GPU 240 is able to change configuration of the main link 270 quickly and without visibly impacting real time transmission and display of frames of video data. In step 444, the GPU 240 transmits active video data, such as a frame of pixel data 282, to the display device 110 via the main link 270. In step 446, the GPU 240 checks to see if the display device 110 is synchronized with the main link 270, for example by reading an appropriate DPCP register. The method terminates in step 490.

Returning to step 420, if the NLT capability configuration flag indicates that the display device 110 does not support the proposed configuration with NLT, then the method proceeds to step 430. If, in step 430, configuration for the main link 270 should be restored, then the method proceeds to step 432, where the GPU 240 restores the main link 270 to a previous configuration. The method then proceeds back to step 414.

Returning to step 430, if the configuration for the main link 270 should not be restored, then the method proceeds to step 434, where the GPU 240 performs link training for the main link 270. Link training may include any necessary steps to ready the main link 270 for transmission of active video data.

Persons skilled in the art will recognize that the display device 110 may be required to resynchronize to a new pixel and line position of incoming pixel data after transmission of active video resumes. The display device 110 may use a vertical blanking indication, such as a vertical blanking symbol within the main link 270, as a frame level synchronization point. After the synchronization point, new frame data is scanned out to the LCD device 216. Prior to detecting the frame level synchronization point, state retention properties conventionally associated with liquid crystal materials may provide image continuity for a at least a partial frame time and potentially multiple frame times. After detecting the frame level synchronization point, the display device 110 scans video data received from the GPU 240 to the LCD device 216 according to any technically feasible technique.

The above NLT protocol enables the GPU 240 to quickly reconfigure the main link 270, thereby enabling the GPU 240 to direct the display device 110 to dynamically change between different refresh modes, for example, on a frame by frame basis. This allows the GPU 240 to direct the display device 110 to operate at a low refresh rate during spans of time when identical frames are being displayed and operate at high frame rates when frame information is changing rapidly. For example, a user may interact with an application in real time, requiring a high frame rate. The user may then pause for a moment, during which time no changes are written to the display device 110. During the pause, the GPU 240 may direct the display device 110 to enter a relatively low frame rate to reduce power while slowly refreshing a static image. Persons skilled in the art will recognize that the GPU 240 may reconfigure the main link 270 for any technically feasible reason without departing the scope and spirit of the present invention.

In sum, a technique is disclosed for dynamically configuring a digital video link, such as main link 270. The digital video link is configured to transmit video data from the GPU 240 to the display device 110 based on stored link driver parameters and link receiver parameters. In one embodiment, parameters for a most recent link configuration are stored in nonvolatile memory. When the digital video link is enabled, the display device 110 and GPU 240 are configured to use their respective stored parameters. In another embodiment, parameters for plural digital video link configurations are stored and available within the display device 110 and the GPU 240. The GPU 240 may efficiently transition the digital video link to operate in any previous configuration. Because each previous configuration is stored to include successfully trained link driver parameters and link receiver parameters, link training may be avoided when transitioning to a previously stored configuration.

One advantage of the disclosed technique is that a given digital video link may be reconfigured to operate in range of refresh modes from high performance to low power without dropping frames. This ability enables a GPU to dynamically select a refresh mode that satisfies an instantaneous requirement, such a high performance or low power for a dynamically determined number of frames.

While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state nonvolatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the invention.

In view of the foregoing, the scope of the invention is determined by the claims that follow.

What is claimed is:

1. A method performed by a processing unit to configure a digital video link coupled to a sink device, the method comprising:

reading an NLT capabilities register within the sink device;

based on data within the NLT capabilities register, determining that the sink device is capable of operating in conjunction with a current configuration for the digital video link without link training being performed on the digital video link;

enabling the digital video link;

transmitting at least one idle pattern via the digital video link; and after transmitting at least one idle pattern, transmitting active video data via the digital video link without link training being performed on the digital video link.

2. The method of claim 1, wherein the NLT capabilities register is disposed within a register space associated with the sink device, and wherein the register space is accessed via a source-to-sink control communications channel.

3. The method of claim 2, wherein the step of enabling the digital video link comprises writing a configuration register within the register space to indicate that reconnection should not include link training.

4. The method of claim 2, further comprising the step of reading a configuration register disposed within the register space to determine whether one or more specified configurations are supported by the sink device for no link training reconfiguration.

5. The method of claim 4, wherein a set of link training parameters residing in a local memory associated with the sink device are associated with the specified configuration for operating the digital video link in the specified configuration.

6. The method of claim 2, wherein the active video data comprises encoded pixel data and clock information, and wherein the digital video link comprises at least one serial lane configured for transmitting the encoded pixel data and the clock information to the sink device.

7. The method of claim 6, wherein a link driver and a link receiver coupled to the at least one serial lane are configured to determine parameters for reliably transmitting the pixel data via the at least one serial lane.

8. The method of claim 7, wherein a set of link training parameters that represent internal link characteristics includes at least equalization parameters and drive strength parameters, and wherein the set of link training parameters resides in a local memory associated with the sink device, and wherein the link training parameters are used when no link training is required to enter a selected configuration.

9. The method of claim 8, wherein link training is required if the local memory associated with the sink device does not store the selected configuration when the digital video link is required to enter the selected configuration.

10. The method of claim 8, wherein the local memory associated with the sink device comprises read-only storage that is configured for at least one predetermined hardware configuration.

11. The method of claim 8, wherein the sink device is configured to determine whether the set of link training parameters corresponding to the selected configuration is available from local memory associated with the sink device, and wherein the sink device indicates whether link training is required for the selected configuration based on availability of the set of link training parameters.

12. The method of claim 7, further comprising the steps of:

writing a value of true to a start flag within the register space;

disabling the digital video link; and reconfiguring the digital video link to a previously operable configuration.

13. The method of claim 8, further comprising the step of transmitting active video data via the reconfigured digital video link after first transmitting at least one idle pattern via the reconfigured digital video link.

14. The method of claim 6, wherein the active video data further comprises at least one link alignment packet configured to enable the sink device to detect a start of structured data within the active video data.

15. The method of claim 14, wherein the at least one link alignment packet comprises a scrambler reset packet, and the structured data comprises at least one frame of video data.

16. The method of claim 8, further comprising the step of waiting for a synchronization status flag to indicate the digital video link has been resynchronized, thereby enabling a transition from transmitting the at least one idle pattern to transmitting active video for display.

17. The method of claim 1, wherein the sink device comprises a display device configured to generate one or more visual frames of data based on the active video data.

18. A non-transitory computer-readable storage medium including instructions that, when executed by a processing unit, cause the processing unit to configure a digital video link coupled to a sink device, by performing the steps of:

reading an NLT capabilities register within the sink device;

based on data within the NLT capabilities register, determining that the sink device is capable of operating in conjunction with a current configuration for the digital video link without link training being performed on the digital video link;

enabling the digital video link;

transmitting at least one idle pattern via the digital video link; and after transmitting at least one idle pattern, transmitting active video data via the digital video link without link training being performed on the digital video link.

19. The computer-readable storage medium of claim 18, wherein the NLT capabilities register is disposed within a register space associated with the sink device, and wherein the register space is accessed via a source-to-sink control communications channel.

20. The computer-readable storage medium of claim 19, wherein the step of enabling the digital video link comprises writing a configuration register within the register space to indicate that reconnection should not include link training.

21. The computer-readable storage medium of claim 19, further comprising the step of reading a configuration register disposed within the register space to determine whether one or more specified configurations are supported by the sink device for no link training reconfiguration.

22. The computer-readable storage medium of claim 21, wherein a set of link training parameters residing in a local memory associated with the sink device are associated with the specified configuration for operating the digital video link in the specified configuration.

23. The computer-readable storage medium of claim 19, wherein the active video data comprises encoded pixel data and clock information, and wherein the digital video link comprises at least one serial lane configured for transmitting the encoded pixel data and the clock information to the sink device.

24. The computer-readable storage medium of claim 23, wherein a link driver and a link receiver coupled to the at least one serial lane are configured to determine parameters for reliably transmitting the pixel data via the at least one serial lane.

25. The computer-readable storage medium of claim 24, wherein a set of link training parameters that represent internal link characteristics includes at least equalization parameters and drive strength parameters, and wherein the set of link training parameters resides in a local memory associated with the sink device, and wherein the link training parameters are used when no link training is required to enter a selected configuration.

26. The computer-readable storage medium of claim 25, wherein link training is required if the local memory associated with the sink device does not store the selected configuration when the digital video link is required to enter the selected configuration.

27. The computer-readable storage medium of claim 25, wherein the local memory associated with the sink device comprises read-only storage that is configured for at least one predetermined hardware configuration.

28. The computer-readable storage medium of claim 25, wherein the sink device is configured to determine whether the set of link training parameters corresponding to the selected configuration is available from local memory associated with the sink device, and wherein the sink device indicates whether link training is required for the selected configuration based on availability of the set of link training parameters.

29. The computer-readable storage medium of claim 24, further comprising the steps of:

writing a value of true to a start flag within the register space;

disabling the digital video link; and reconfiguring the digital video link to a previously operable configuration.

30. The computer-readable storage medium of claim 25, further comprising the step of transmitting active video data via the reconfigured digital video link after first transmitting at least one idle pattern via the reconfigured digital video link.

31. The computer-readable storage medium of claim 23, wherein the active video data further comprises at least one link alignment packet configured to enable the sink device to detect a start of structured data within the active video data.

32. The computer-readable storage medium of claim 31, wherein the at least one link alignment packet comprises a scrambler reset packet, and the structured data comprises at least one frame of video data.

33. The computer-readable storage medium of claim 25, further comprising the step of waiting for a synchronization status flag to indicate the digital video link has been resynchronized, thereby enabling a transition from transmitting the at least one idle pattern to transmitting active video for display.

34. The computer-readable storage medium of claim 18, wherein the sink device comprises a display device configured to generate one or more visual frames of data based on the active video data.

35. A computing device, comprising:

a nonvolatile parameter memory;

a processing unit coupled to the nonvolatile parameter memory and configured to:

read an NLT capabilities register disposed within a register space associated with a display device;

based on data within the NLT capabilities register, determine that the display device is capable of operating in conjunction with a current configuration of a digital video link coupled to the display device without link training being performed on the digital video link;

enable the digital video link;

transmit at least one idle pattern via the digital video link; and after transmitting at least one idle pattern, transmit active video data via the digital video link without link training being performed on the digital video link.

36. The computing device of claim 35, wherein the processing unit is further configured to:

write a value of true to a start flag within the register space;

disable the digital video link;

reconfigure the digital video link to a previously operable configuration; and transmit active video data via the reconfigured digital video link after transmitting at least one idle pattern via the reconfigured digital video link.

* * * * *